July 30, 1940.
H. J. DENNIS
2,209,446
WEATHER STRIP
Filed March 28, 1936
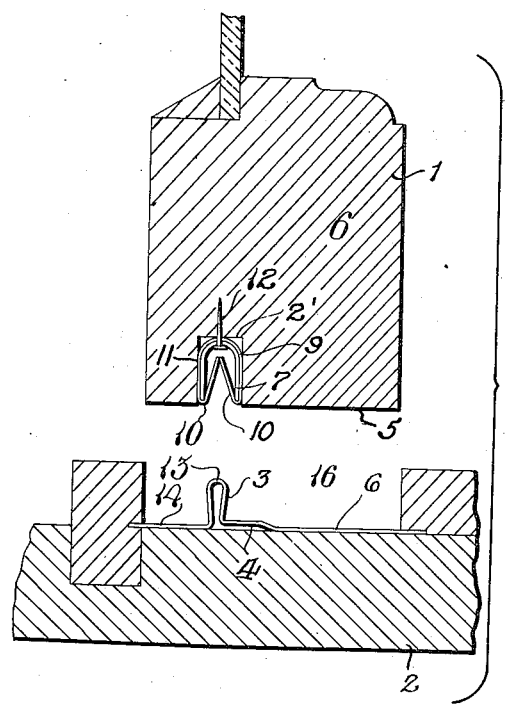
INVENTOR
H.J. DENNIS
BY Fetherstonhaugh & Co.
ATTYS.

Patented July 30, 1940

2,209,446

UNITED STATES PATENT OFFICE 2,209,446

WEATHER STRIP

Herbert J. Dennis, Winnipeg, Manitoba, Canada

Application March 28, 1936, Serial No. 71,503
In Canada March 30, 1935

1 Claim. (Cl. 20—69)

My invention relates to improvements in weather strip and an object of the invention is to provide an improved form of weather strip which will effectually prevent the passage of air from one side of a window around which my weather strip is fitted to the other side thereof.

A further object of my invention is to provide a weather strip which will give many years of thoroughly efficient service.

A further object of my invention is to provide a weather strip of the character herewith described which is easily manufactured and very simple to install.

A further object of my invention is to provide a weather strip which can be manufactured for a very small outlay.

With the above more important objects in view and such other minor objects as may appear as the specification proceeds, my invention consists essentially in the arrangement and construction of parts all as hereinafter more particularly described, reference being had to the accompanying drawing, in which the figure illustrates a side elevation of an embodiment of my improved type of weather strip.

My invention relates to the separable type of weather strip for use between a sash 1 and an associated casement 2 for instance, or for other conditions where a draft may enter between two separable parts.

For purposes of illustration, however, I prefer to illustrate my invention in situ upon a sash 1 and an associated casement 2, the former being provided with a longitudinally extending groove 2', into which a conventional tongue 3 may extend when the sash is down. The tongue 3 is of conventional design except for the spaced portion 4 thereof, which is designed to contact the lower edge 5 of the sash, the purpose of this arrangement being to prevent the heads of tacks driven into the casement through the nailing strip 6, from projecting and permitting the passage of a draught between the under surface of the sash and the upper surface of the nailing strip.

The essence of my invention, however, resides in the weather strip which I have designed for insertion into the groove 2', the same consisting of a reinforcing strip 7 of U-shaped cross-sectional configuration embracing the outer surface of which is a light, resilient metallic strip 9, the outer edges of which are turned around the edges 10 of the reinforcing strip to angle towards the interior thereof as clearly illustrated.

By reference to the accompanying drawing, it will be seen that the resilient strip 9 extends into the interior of the U-shape reinforcing strip in the form of a pair of longitudinally extending and converging spring leaves 11, the foregoing device being secured in the groove 2' at intervals by means of the tacks 12.

It will now be obvious that when the tongue 3 comes into engagement with the leaves 11, the latter will yield outwardly but remain in engagement with the tongue, so that a peculiarly effective draught proofing effect is attained.

Since various modifications can be made in the above invention and many apparently widely different embodiments of same, made within the scope of the claim without departing from the spirit and scope thereof, it is intended that all matter contained in the accompanying specification shall be interpreted as illustrative only and not in a limiting sense and I desire only such limitations placed thereon as are specifically expressed in the accompanying claim.

What I claim as my invention is:

In a separable type weather strip comprising a tongue and complementary groove, the means for providing a draught proofing assembly comprising a longitudinally extending reinforcing strip of U-shaped cross-sectional configuration, a resilient metallic strip embracing the outer surface of said reinforcing strip for the length thereof, said strip being turned around the edges of said U-shaped reinforcing strip to project into the interior thereof in the form of a pair of longitudinally extending and converging spring leaves, said reinforcing strip together with said resilient strip being secured within said groove, said converging spring leaves being yieldable upon the introduction of said tongue into the interior of said reinforcing strip.

HERBERT J. DENNIS.